United States Patent [19]

Takeuchi

[11] Patent Number: 4,563,165

[45] Date of Patent: Jan. 7, 1986

[54] CLUTCH WITH DAMPER DISC ASSEMBLY

[75] Inventor: Hiroshi Takeuchi, Higashiosaka, Japan

[73] Assignee: Kabushiki Kaisha Daikin Seisakusho, Osaka, Japan

[21] Appl. No.: 640,826

[22] Filed: Aug. 15, 1984

[30] Foreign Application Priority Data

Aug. 29, 1983 [JP] Japan ................. 58-158661

[51] Int. Cl.[4] .............................................. F16D 3/14
[52] U.S. Cl. .................... 464/64; 192/106.2; 464/68
[58] Field of Search .......... 192/106.1, 106.2; 464/64, 66, 68, 81

[56] References Cited

U.S. PATENT DOCUMENTS

| | | | |
|---|---|---|---|
| 3,296,887 | 1/1967 | Larsen | 464/66 X |
| 4,185,728 | 1/1980 | Gatewood | 464/68 X |
| 4,396,103 | 8/1983 | Loizeau | 192/106.2 |
| 4,430,064 | 2/1984 | Lamarche | 464/64 |
| 4,433,770 | 2/1984 | Loizeau et al. | 192/106.2 |

FOREIGN PATENT DOCUMENTS

| | | |
|---|---|---|
| 2044397 | 10/1980 | United Kingdom . |
| 2100389 | 12/1982 | United Kingdom ................ 464/68 |

*Primary Examiner*—Stuart S. Levy
*Assistant Examiner*—Daniel P. Stodola
*Attorney, Agent, or Firm*—Burns, Doane, Swecker & Mathis

[57] ABSTRACT

A damper disc assembly includes an outward flange of a hub that is divided into an inner peripheral portion and an outer peripheral portion, an external tooth of the flange inner peripheral portion being meshed with an internal tooth of the flange outer peripheral portion with a circumferential clearance left therebetween. The inner peripheral portion and the outer peripheral portion of the flange are elastically interconnected through a weak first torsion spring extending in a circumferential direction. Side plates are disposed on both sides of the flange. The flange outer peripheral portion is elastically interconnected with the side plates through a strong second torsion spring extending in the circumferential direction. A locking member enters the clearance between the external tooth and the internal tooth when centrifugal force generated by rotation of the damper disc assembly acts on the locking member. A spring mechanism urges the locking member in the direction extending out of the clearance, and rigidity of the spring mechanism is determined so that the rigidity overcomes the centrifugal force at a low rotation speed and the centrifugal force overcomes the rigidity at a high rotational speed.

4 Claims, 5 Drawing Figures

CLUTCH WITH DAMPER DISC ASSEMBLY

FIELD OF THE INVENTION

This invention relates mainly to a damper disc assembly suitable for an automobile clutch disc.

DESCRIPTION OF THE PRIOR ART

A damper disc having multi-stage rigidity and multi-stage hysteresis torque characteristics has conventionally been known, wherein an outward flange of a hub which integrally includes it is divided into two: an outer peripheral portion and an inner peripheral portion, sub-side plates in addition to annular side plates are fitted onto the hub and at the same time they are elastically interconnected through many kinds of torsion springs, so that a twist angle $\theta$-twist torque T characteristic as shown in FIG. 1 is provided in the damper disc.

In a damper disc having the characteristic as shown in FIG. 1, a torsional rigidity changes in three steps and at the same time a hysteresis torque changes in two steps in the course of damper's twisting from its neutral state to its maximum twisted state. Here, a torsional vibration of low torque is absorbed in a low twist angle region (0 to $\theta_1$) so that the torsional rigidity is set to a low value and the hysteresis torque is also set to a low value. For this reason, in case for example when the damper disc is employed in a clutch disc for vehicle, this characteristic in the small twist angle region is effective for a countermeasure against noise at a low rotational speed such as an idling, but on the contrary it has a disadvantage of inducing or enhancing oscillation of vehicle body at the time of tip-in/tip-out in running (when a slight stepping-in/releasing-out operation of an acceleration pedal is quickly done).

SUMMARY OF THE INVENTION

In consideration of the above disadvantage, an object of this invention is to provide a damper disc wherein a hysteresis path is directly shifted to a second-stage rigidity region of a negative side at a high rotational speed without permitting it to pass through a first-stage rigidity region having low twist torque, low hysteresis torque characteristics when returning from a large twist angle region, so that a torque fluctuation can be securely absorbed without inducing or enhancing disadvantages such as oscillation of vehicle body etc. even when a violent fluctuation arising at the time of tip-in/tip-out is generated.

In order to accomplish the above object in this invention; in a damper disc assembly wherein an outward flange of a hub is divided into an inner peripheral portion and an outer perioheral portion, an internal tooth of the flange outer peripheral portion is meshed with an external tooth of the flange inner peripheral portion with a circumferential clearance left therebetween and at the same time the inner and outer peripheral portions of the flange are elastically interconnected to each other through a weak first torsion spring extending in the circumferential direction, and side plates are disposed on both sides of the flange and at the same time the flange outer peripheral portion is elastically interconnected to the side plates through a strong second torsion spring extending in the circumferential direction; a locking member is provided which enters a clearance between said external tooth and said internal tooth through means of a centrifugal force generated by rotation of the damper disc assembly to fix the inner peripheral portion to the outer peripheral portion of the flange, a spring mechanism urging said locking member in the direction extending out of said clearance is provided, and a rigidity of the spring mechanism is determined so that the rigidity overcomes the centrifugal force at a low rotational speed and the centrifugal force overcomes the rigidity at a high rotational speed.

DETAILED DESCRIPTION OF THE INVENTION

Figure 2:
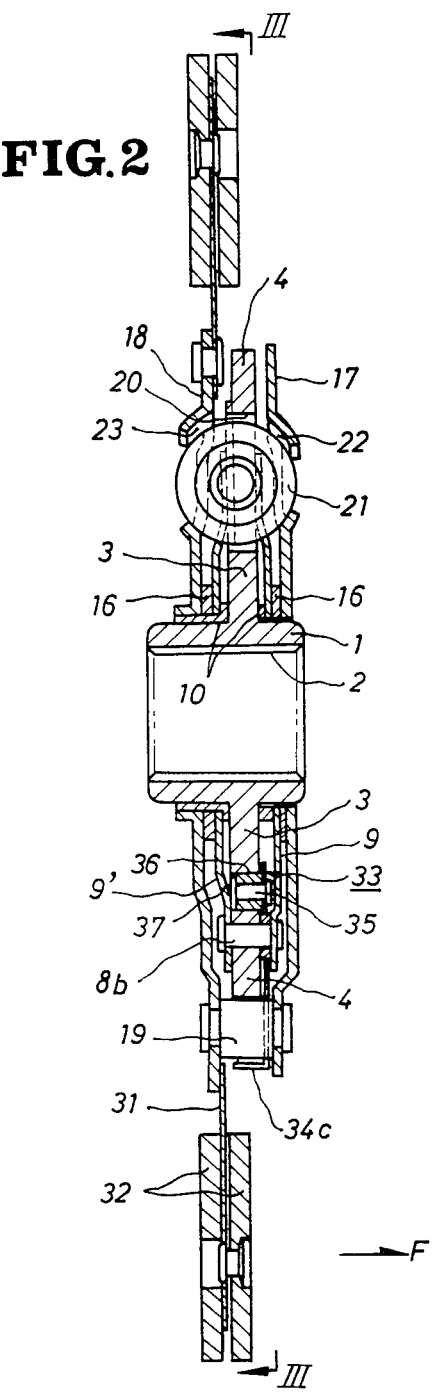
FIG. 2 is a vertical sectional side view of the damper disc assembly according to the present invention employed in a clutch disc for automobile.
Figure 4:
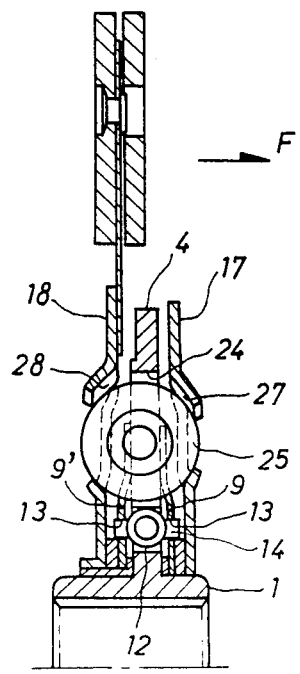
FIG. 4 is a partial sectional view taken on a line IV—IV of FIG. 3.
Figure 3:
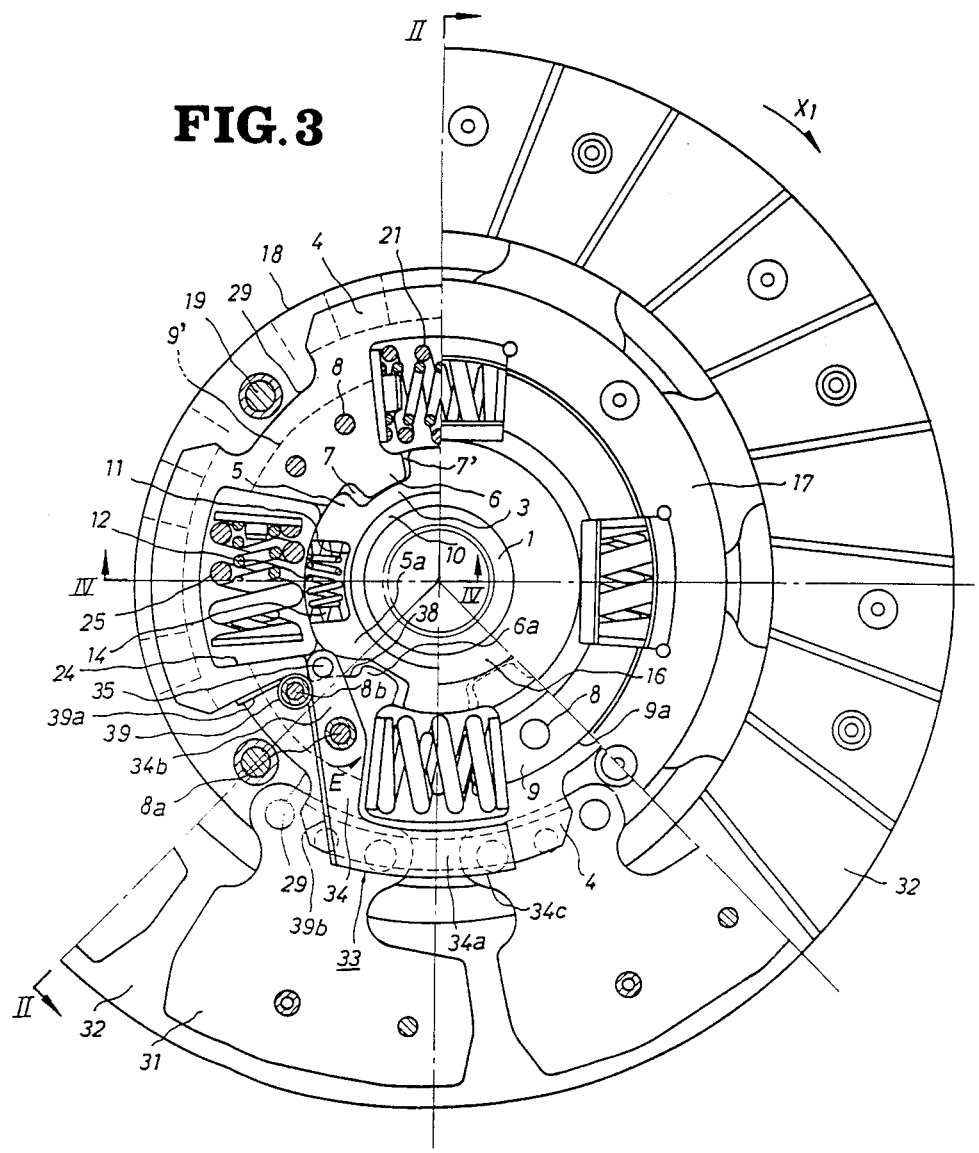
FIG. 3 is a partial sectional view taken on a line III—III of FIG. 2.

FIG. 2 is a partial vertical sectional side view of the damper disc according to the present invention employed in a clutch disc for automobile, and corresponds to a sectional view taken on the line II—II of FIG. 3 which is the partial sectional view taken on the line III—III thereof. Further, FIG. 4 is a partial sectional view taken on the line IV—IV of FIG. 3. Here, an arrow F indicates a forward side.

In FIG. 2, a spline hub 1 is spline fitted onto a horizontal output side clutch shaft (not shown) at an inner internal peripheral spline 2, and has a flange inner peripheral portion 3 integral therewith. A flange outer peripheral portion 4 is disposed on the same vertical plane at an outer peripheral side of the inner peripheral portion 3. An external tooth 5 is provided at an outer periphery of the inner peripheral portion 3 which meshes with an internal tooth 6 of the outer peripheral portion so as to be freely rotatable between circumferential clearaces 7, 7' therebetween, as shown in FIG. 3. Further, a pair of sub-plates 9, 9' are securely fixed to both front and rear side faces of the flange outer peripheral portion 4 by means of a sub-pin 8. The sub-plates, 9, 9' are parts made as plates having radial sector projections 9a. The inner peripheral end faces of the sub-plates fit freely slidingly onto an outer peripheral surface of the hub 1 to support the flange outer peripheral portion 4 concenterically with the hub 1. A friction material 10 is interposed between inner peripheral portions of the sub-plates 9, 9' and the flange inner peripheral portion 3. First torsion springs 12 (first-stage springs) are compressively installed in two notches 11 provided on an outer peripheral part of the flange inner peripheral portion 3 with their center lines laid along a circumference of the disc between a pair of washers 14. Portions (FIG. 4) of the washers 14 extend from both sides of the washer 14 and fit in notches 13 provided on the sub-plates 9, 9'.

As shown in FIG. 2, a retaining plate 17 and a clutch plate 18 are disposed on outer sides of the sub-plates 9, 9' opposite to the flange inner peripheral portion 3 with friction washers 16 therebetween. Outer peripheral portions of the both plates 17, 18 are integrally interconnected each other by means of a stop pin 19. Second torsion springs 21 (second-stage springs) are compressively installed in two window holes 20 provided on the same circumference of the flange outer peripheral portion with their center lines extended in the circumferential direction. Portions of the spring 21 extend from the window hole 20 fit in two window holes 22, 23 provided on the plates 17, 18. End faces at both disc's circumferential ends of the window holes 20, 22, 23 align each other at respective circumferential positions under a neutral state, and at this time both end faces of the spring 21 compressedly contact both circumferential end faces of the window holes 20, 22, 23.

Further other window holes 24 (FIG. 4) are provided in two places on the same circumference of the flange outer peripheral portion 4, and third torsion springs 25 (third-stage springs) are installed in the window holes 24 with their center lines extending in the circumferential direction. Portions of the spring 25 extending from the window hole 24 fit in window holes 27, 28 provided on the plates 17, 18. The third spring 25 compressedly contacts both disc's circumferential ends of the window holes 27, 28. The length of the window hole 24 is set shorter than those of the window holes 27, 28 in the disc's circumferential direction, and consequently a circumferential clearance is formed between the window hole 24 and the spring under the neutral state as shown in FIG. 3.

Incidentally, the stop pin 19 is disposed in a notch 29 provided on an outer peripheral part of the flange outer peripheral portion 4 with a circumferential clearance left therebetween. Further, a facing 32 is fastened to an outer peripheral portion of the clutch plate 18 through a cushioning plate 31. The facing 32 is disposed between a flywheel on an engine side (not shown) and a pressure plate on a clutch case side.

Further, in the damper disc assembly according to the present invention, a locking member 33 is disposed between the flange outer peripheral portion 4 and the sub-plate 9 as illustrated in FIG. 2. Although only one piece is shown in the figure, actually two locking members 33 of the same construction are disposed on the same diametral circle. As shown in FIG. 3, a rotating part 34 of the locking member 33 is formed into an L-shape plate and its outer peripheral portion 34a extends in the circumferential direction to serve also as a weight. Further, a bent portion 34c is formed at an outer peripheral end of the outer peripheral portion 34a to increase a weight thereof, and covers the flange outer peripheral portion 4 from its outer peripheral side. A central part of an inner peripheral portion 34b of the rotating part 34 fits freely rotatably onto a pin 8a among the sub-pins 8. A pin 35 parallel to a disc center line is fixed to an inner peripheral end of the inner peripheral portion 34b, and the pin 35 projects into a clearance between the flange inner peripheral portion 3 and the outer peripheral portion 4 so that a roller 36 into which the pin fits is disposed between the inner peripheral portion 3 and the outer peripheral portion 4 as shown in FIG. 2. A flange 37 is integrally formed at a rear end of the pin 35 to prevent the roller 36 from slipping off. As shown in FIG. 3, a contacting surface of the external tooth 5a in the vicinity of the pin 35 is sloped so as to mate with a track of the pin 35 having its center at the pin 8a. Further, a notch 38 extenting from an internal tooth 6a to an outer peripheral side is formed on the flange outer peripheral portion 4, and a bottom surface of the notch 38 is formed into a circular-arc-shape having its center at the pin 8a so as to mate with a track of the pin 35. A torsion spring 39 (an example of the spring mechanism) fits onto a pin 8b forming a counterpart with the pin 8a. One end 39a of the spring 39 hooks to one end of the notch 29 and the other end 39b compressively hooks to an outer peripheral portion 34a of the rotating part 34. Accordingly, the rotating part 34 is always urged in the direction of an arrow E by means of the spring 39.

Now, the function of the damper disc will be described. When a pressure plate (not shown) presses the facing 32 against a flywheel of an engine, a torque will be transmitted from the flywheel through the facing 32, the plate 31, the plate 18, the spring 21, the flange outer peripheral portion 4, the spring 12 (FIG. 3), the flange inner peripheral portion 3 and the hub 1 to an output shaft. Incidentally, a rotational direction of disc is the direction of arrow $X_1$ of FIG. 3.

Figure 1:
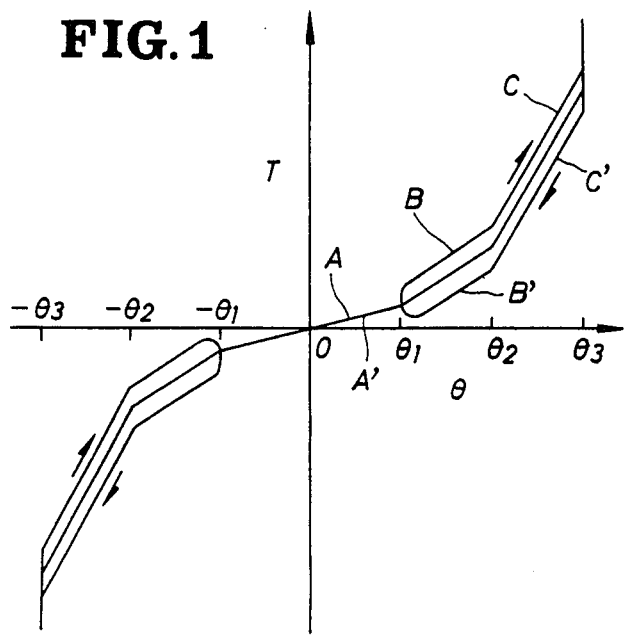
FIG. 1 and FIG. 5 are graphs showing twist angle-twist torque characteristics.

For example when a twist torque is applied on the facing 32 in the direction of $X_1$ in relation to the spline hub 1, torque vibration will be absorbed in the following manner. The function will be described hereunder on the basis of FIG. 1 showing the twist angle $\theta$-twist torque T characteristics.

(In case of small rotational speed)

(First stage) When the facing 32 is twisted from a neutral state in the direction of $X_1$ in relation to the hub 1, the rigidity of the first torsion spring 12 is set greater than that of the second torsion spring 21 within a twist angle $\theta$ from 0 to $\theta_1$, so that the spring 21 functions as a rigid body to rotate the plate 18 integrally with a flange outer peripheral portion 4. As the result, torsion arises between the flange outer peripheral portion 4 and the inner peripheral portion 3, the spring 12 is compressed by the sub-plates 9, 9' and at the same time a slip is produced on a surface of the friction material 10 to cause a slight friction torque, thus a relation A of FIG. 1 is obtained. Since the rotational speed is small (under an idling condition, for instance) in this case, a centrifugal force acting on the outer peripheral portion 34a of the locking member 33 is small and the pin 35 does not fit in between the teeth 5a, 6a and to the spring 39 keeps the pin disengaged therefrom as shown in FIG. 3.

(Second stage) When the spring 12 is compressed to cause end faces of the internal tooth 5 and the external tooth 6 to contact each other, the torsion will not progress any more between the flange inner peripheral portion 3 and the outer peripheral portion 4. Accordingly, the flange outer peripheral portion 4 twists against the plate 18 within a twist angle $\theta$ from $\theta_1$ to $\theta_2$, the spring 21 is compressed and at the same time a slip is produced on a surface of a washer 16 to cause a friction torque, thus a relation B of FIG. 1 is obtained. Twisting of the plate 18 against the flange outer peripheral portion 4 reduces the disc's circumferential clearance between the flange outer peripheral portion 4 and the spring 25 of FIG. 3, and finally the twist angle $\theta$ reaches $\theta_2$ when the clearance becomes zero.

(Third stage) Both the second and third springs 21, 25 are compressed within a twist angle $\theta$ from $\theta_2$ to $\theta_3$, thus a relation C of FIG. 1 is obtained. When the twist angle $\theta$ reaches $\theta_3$, the stop pin 19 contacts with a circumferential end face of the notch 29 and the plate 18 becomes integrated with the flange outer peripheral portion 4 through the stop pin 19, thus the torque is directly transmitted to the hub 1.

(Stage returning from max. twist angle $\theta_3$) Conversely to the above actuation, relations C', B' and A' are obtained owing to friction of the friction material 10 and the washer 16. Incidentally, a hysteresis obtained by the friction of the friction material 10 is set to an extremely small value in the first stage (0-$\theta_1$), so that A and A' are shown by the same straight line.

(In case of large rotational speed)

(First stage) As with the case of small rotational speed, the first torsion spring 12 is compressed first and the outer peripheral portion 4 rotates in the direction of $X_1$ in relation to the flange inner peripheral portion. Thus the clearance between the external tooth 5a and the internal tooth 6a widens. Since the rotational speed is large (vehicle running condition, for instance) in this case, the outer peripheral portion 34a of the rotating part 34 overcomes the torsion spring 39 with the help of its centrifugal force so that the rotating part 34 moves circumferentially and outwardly. As the result, the rotating part 34 rotates around the pin 8a in the direction opposite to the arrow E and the pin 35, onto which the roller is fitted, is engaged between the external tooth 5a and the internal tooth 6a. The engagement of the pin 35 causes the flange inner peripheral portion 3 to be integrated with the outer peripheral portion 4 with the spring 12 kept compressed as it is.

(Second & third stages) The actuation is the same as that of the case of small rotational speed.

Figure 5:
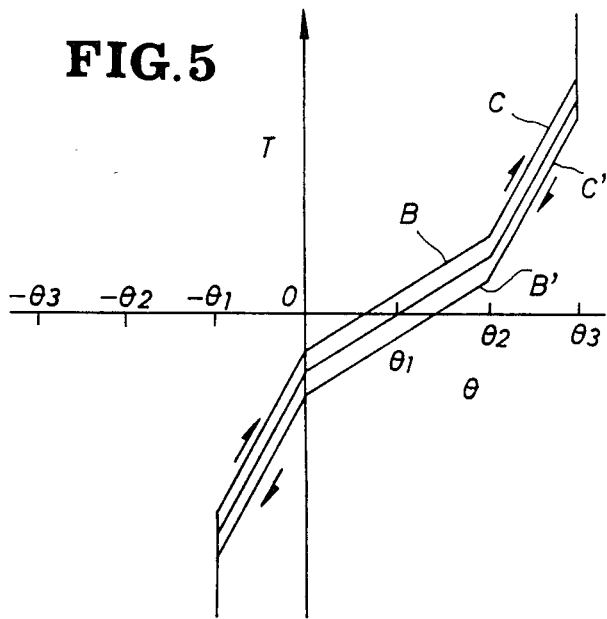

(Stage returning from max. twist angle $\theta_3$) In this stage the pin 35 of the locking member 33 is engaged between the external tooth 5a and the internal tooth 6a to cause the flange inner peripheral portion 3 to be integrally connected to the outer peripheral portion 4, so that the first stage actuation accompanied by the compression of the first torsion spring 12 does not occur. Accordingly, the disc presents a characteristic having no low hysteresis torque region (first stage) as shown by FIG. 5 in this case.

Incidentally, when the rotational speed is reduced from the above stage, the spring 39 overcomes the centrifugal force causing the rotating part 34 to rotate in the direction of the arrow E and pull the pin 35 out from between the teeth 5a, 6a, so that the characteristic will automatically returns to that of FIG. 1. Further, in case of twisting the disc from the neutral state in the direction opposite to E, the clearance between the both teeth 5a, 6a becomes smaller as twisting occurs between the flange 3 and the outer peripheral portion 4, so that there is no chance of the flange inner peripheral portion 4 and the outer peripheral portion 3 being locked regardless of the rotatioanl speed. Consequently, the characteristic of FIG. 1 can always be obtained independently of the rotational speed.

As mentioned above, according to this invention, in the damper disc assembly wherein the outward flange of the hub 1 is divided into the inner peripheral portion 3 and the outer peripheral portion 4, the internal tooth 6 of the flange outer peripheral portion 4 is meshed with the external tooth 5 of the flange inner peripheral portion 3 with the circumferential clearance left therebetween at the same time the inner peripheral portion 3 and the outer peripheral portion 4 of the flange are elastically interconnected to each other through the weak first torsion spring 12 extending in the circumferential direction, and the side plates (for example, the clutch plate 18 and the retaining plate 17) are disposed on both sides of the flange at the same time the flange outer peripheral portion 4 is elastically interconnected to the side plates through the strong torsion spring 21 extending in the circumferential direction. The locking member 33 is provided which enters the clearance between said external tooth 5 and said internal tooth 6 through means of the centrifugal force generated by the rotation of the damper disc assembly. The spring mechanism (for example, the return spring 39) urges said locking member 33 in the direction out of said clearance. The rigidity of the spring mechanism is determined such that the rigidity overcomes the centrifugal force at the low rotational speed and the centrifugal force overcomes the rigidity at the high rotational speed. In this manner the twist angle $\theta$—twist torque T characteristic can be obtained, wherein the hysteresis path is directly shifted to the second-stage rigidity region of the negative angle of twist side at the high rotational speed without permitting it to pass through the first-stage rigidity region having the low twist torque, and low hysteresis torque characteristic when returning from the large twist angle region. Therefore, in the case when this damper disc is employed in the clutch disc for vehicle, the present invention has the advantage that the torque fluctuation can be securely absorbed without inducing or enhancing disadvantages such as oscillation of vehicle body etc. even when the violent fluctuation arising at the time of tip-in/tip-out is generated.

Incidentally, the following construction may be employed when practicing the present invention.

(i) The locking member 33 and the spring mechanism may be disposed between the flange outer peripheral portion 4 and the sub-plate 9', or may be disposed on both sides of the flange outer peripheral portion 4.

(ii) A part of the plurally provided locking member 33 and the spring mechanism may be disposed also on the side, among the external tooth 5 and the internal tooth 6, where the clearance is widened when the facing twists in the direction opposite to $X_1$ in relation to the hub 1. Thus, in the event the disc twists in the direction opposite to $X_1$, the characteristic of not passing through the first-stage rigidity region as with FIG. 5 can be obtained.

(iii) For the springs 12, 21 and 25, the coil spring is not necessarily required but a rubber-like elastic body may be utilized in place of it.

What is claimed is:

1. A damper disc assembly comprising an outward flange of a hub divided into an inner peripheral portion and an outer peripheral portion, an external tooth of the flange inner peripheral portion being meshed with an internal tooth of the flange outer peripheral portion with a circumferential clearance left therebetween, the inner peripheral portion and the outer peripheral portion of the flange being elastically interconnected through a weak first torsion spring extending in a circumferential direction, a plate being positioned on each side of the flange and the flange outer peripheral portion being elastically interconnected with the plates through a strong second torsion spring extending in the circumferential direction; a locking member being provided between the flange and one of the plates, at least a portion of the locking member being operable to enter a clearance between the external tooth and the internal tooth through means of centrifugal force generated by rotation of the damper disc assembly, a spring mechanism urging the locking member in the direction extending out of said clearance is provided, and a rigidity of the spring mechanism is determined such that the rigidity of the spring mechanism overcomes the centrifugal force on the locking member at a low rotation speed and the centrifugal force on the locking member overcomes the rigidity of the spring mechanism at a high rotational speed wherein said locking member has an approximately L-shaped rotating part, an outer peripheral portion of the rotating part extends in the circumferential direction to serve also as a weight and carry a pin parallel to a disc center line at an inner peripheral portion of the rotating part, a roller is fitted onto the pin, the roller being allowed to enter said clearance between the external tooth and the internal tooth.

2. A damper disc assembly as set forth in claim 1, in which a bent portion is formed on the outer peripheral portion of said rotating part, and the bent portion covers the flange outer peripheral portion from an outer peripheral side.

3. A damper disc assembly as set forth in claim 1, in which said spring mechanism comprises a torsion spring, the torsion spring is fitted onto a pin provided on the flange outer peripheral portion, and one end of the torsion spring compressively hooks to the outer peripheral portion of the rotating part of said locking member.

4. A damper disc assembly as set forth in claim 3, in which a stop pin is provided between said plates, a notch provided on the flange outer peripheral portion engages the stop pin with a circumferential clearance left therebetween, and a second end of said torsion spring hooks to the notch.

* * * * *